(12) United States Patent
Li et al.

(10) Patent No.: US 12,413,807 B2
(45) Date of Patent: *Sep. 9, 2025

(54) VIDEO PROCESSING METHOD AND APPARATUS, DEVICE, AND STORAGE MEDIUM

(71) Applicant: Beijing Bytedance Network Technology Co., Ltd., Beijing (CN)

(72) Inventors: Li Li, Beijing (CN); Linhao Fu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/004,441

(22) PCT Filed: Jul. 2, 2021

(86) PCT No.: PCT/CN2021/104368
§ 371 (c)(1),
(2) Date: Jan. 5, 2023

(87) PCT Pub. No.: WO2022/007724
PCT Pub. Date: Jan. 13, 2022

(65) Prior Publication Data
US 2023/0300403 A1    Sep. 21, 2023

(30) Foreign Application Priority Data
Jul. 6, 2020  (CN) .......................... 202010642222.9

(51) Int. Cl.
*H04N 21/431*  (2011.01)
*H04N 21/44*   (2011.01)

(52) U.S. Cl.
CPC ... *H04N 21/4316* (2013.01); *H04N 21/44016* (2013.01)

(58) Field of Classification Search
CPC ............. H04N 21/4316; H04N 21/44016
See application file for complete search history.

(56) References Cited

U.S. PATENT DOCUMENTS 11,645,249 B1 * 5/2023 Mahyar ............... G06V 10/762
                                                    707/692
2009/0089712 A1   4/2009 Sato
(Continued)

FOREIGN PATENT DOCUMENTS

CN      102625155 A    8/2012
CN      104185073 A    12/2014
(Continued)

OTHER PUBLICATIONS

China National Intellectual Property Administration, Office action issued in Chinese Application No. 202010642222.9, Sep. 3, 2021, 21 pages.
(Continued)

*Primary Examiner* — Nnenna N Ekpo
(74) *Attorney, Agent, or Firm* — Alleman Hall & Tuttle LLP

(57) ABSTRACT

A video processing method and apparatus, a device, and a storage medium, the method includes: obtaining a plurality of target sub-videos; obtaining a plurality of pictures respectively corresponding to the plurality of target sub-videos; playing a respective target sub-video sequentially on the user interface while displaying the plurality of pictures in a user interface. Embodiments of the present disclosure can realize a multi-functionality, thereby meeting requirements of a user and improving a user experience.

19 Claims, 9 Drawing Sheets

(56) References Cited

U.S. PATENT DOCUMENTS

| | | | |
|---|---|---|---|
| 2010/0153831 | A1 | 6/2010 | Beaton |
| 2010/0262911 | A1 | 10/2010 | Kaplan et al. |
| 2012/0272278 | A1* | 10/2012 | Bedi ................ H04N 21/25435 |
| | | | 725/105 |
| 2016/0337609 | A1 | 11/2016 | Zhou |
| 2018/0246625 | A1* | 8/2018 | Luo .................... H04N 21/8586 |
| 2020/0321029 | A1 | 10/2020 | Cui et al. |
| 2022/0353567 | A1* | 11/2022 | Greene ............. H04N 21/4316 |
| 2023/0300403 | A1 | 9/2023 | Li et al. |

FOREIGN PATENT DOCUMENTS

| | | | |
|---|---|---|---|
| CN | 104202658 | A | 12/2014 |
| CN | 104703014 | A | 6/2015 |
| CN | 105472428 | A | 4/2016 |
| CN | 105488145 | A | 4/2016 |
| CN | 106375826 | A | 2/2017 |
| CN | 109391856 | A | 2/2019 |
| CN | 109918068 | A | 6/2019 |
| CN | 111147913 | A | 5/2020 |
| CN | 111246301 | A | 6/2020 |
| CN | 111753132 | A | 10/2020 |
| CN | 111930996 | A | 11/2020 |

OTHER PUBLICATIONS

ISA China Patent Office, International Search Report and Written Opinion issued in Application No. PCT/CN2021/104368, Sep. 30, 2021, WIPO, 12 pages.

China National Intellectual Property Administration, Office action issued in Chinese Application No. 202010642222.9, Dec. 7, 2021, 21 pages.

China National Intellectual Property Administration, Notice of Rejection issued in Chinese Application No. 202010642222.9, Mar. 3, 2022, 7 pages.

China National Intellectual Property Administration, Notice of Rejection Issued in Application No. 202010642206.X, Apr. 20, 2022, 11 pages.

China National Intellectual Property Administration, Office Action Issued in Application No. 202010642206.X, Sep. 4, 2021, 18 pages.

China National Intellectual Property Administration, Office Action Issued in Application No. 202010642206.X, Dec. 21, 2021, 17 pages.

ISA China National Intellectual Property Administration, International Search Report and Written Opinion Issued in Application No. PCT/CN2021/104343, Sep. 28, 2021, WIPO, 17 pages.

United States Patent and Trademark Office, Advisory Action Issued in U.S. Appl. No. 18/004,641, filed Jul. 11, 2024, 5 pages.

United States Patent and Trademark Office, Final Office Action Issued in U.S. Appl. No. 18/004,641, filed Apr. 11, 2023, 9 pages.

United States Patent and Trademark Office, Office Action Issued in U.S. Appl. No. 18/004,641, filed Oct. 6, 2023, 14 pages.

United States Patent and Trademark Office, Office Action Issued in U.S. Appl. No. 18/004,641, filed Aug. 29, 2023, 9 pages.

\* cited by examiner

VIDEO PROCESSING METHOD AND APPARATUS, DEVICE, AND STORAGE MEDIUM

CROSS-REFERENCE TO RELATED APPLICATIONS

This disclosure is a national stage of International Application No. PCT/CN2021/104368, filed on Jul. 2, 2021, which claims priority to Chinese Patent Application No. 202010642222.9, filed on Jul. 6, 2020. Both of the aforementioned applications are hereby incorporated by reference in their entireties.

TECHNICAL FIELD

Embodiments of the present disclosure relate to the field of computer technologies and, in particular, to a video processing method and apparatus, a device, and a storage medium.

BACKGROUND

A video playback function is a common function of a video player or a video playback application of a client. With the development of science and technology, applications of the video playback function are more and more extensive.

However, current video playback applications or video players can only provide users with a single video in a playback interface, cannot provide other information, and at the same time, cannot provide users with convenient and rich functions, thereby affecting a user experience.

SUMMARY

Embodiments of the present disclosure provide a video processing method and apparatus, a device, and a storage medium, which can realize a multi-functionality, thereby meeting requirements of a user and improving a user experience.

In a first aspect, an embodiment of the present disclosure provides a video processing method, the method includes:
 obtaining a plurality of target sub-videos;
 obtaining a plurality of pictures respectively corresponding to the plurality of target sub-videos; and
 playing each target sub-video sequentially on the user interface while displaying the plurality of pictures in a user interface.

In a second aspect, an embodiment of the present disclosure provides a video processing apparatus, the apparatus includes:
 an obtaining module, configured to obtain a plurality of target sub-videos; and configured to obtain a plurality of pictures respectively corresponding to the plurality of target sub-videos; and
 a linkage module, configured to play each target sub-video sequentially on the user interface while display the plurality of pictures in a user interface.

In a third aspect, an embodiment of the present disclosure provide an electronic device, including:
 at least one processor; and memory;
 the memory stores computer executable instructions;
 the at least one processor executes the computer executable instructions stored in the memory, and enables the at least one processor to execute the video processing method according to any one of the above first aspect.

In a fourth aspect, an embodiment of the present disclosure provide a computer readable storage medium, having computer executable instructions stored thereon, where when a processor executes the computer executable instructions, the video processing method according to any one of the above first aspect is implemented.

In the video processing method and apparatus, the device, and the storage medium provided by the embodiments of the present disclosure, a plurality of target sub-videos and a plurality of pictures respectively corresponding to the plurality of target sub-videos are obtained firstly, and then according to the obtained the plurality of target sub-videos and the plurality of pictures, while displaying the plurality of pictures in a user interface, the respective target sub-video may be played sequentially on the user interface, providing users with a convenience to view the plurality of target sub-videos and the plurality of pictures in a same user interface, which realizes a multi-functionality. At the same time, since the plurality of target sub-videos respectively corresponding to the plurality of pictures, a linkage effect can be generated between the pictures and the target sub-videos, so that users have a better viewing experience.

BRIEF DESCRIPTION OF DRAWINGS

In order to illustrate the embodiments of the present disclosure or the technical solutions in the prior art more clearly, the drawings needed to be used in the embodiments or the description of the prior art will be introduce briefly in the following. Obviously, the drawings in the following description are some embodiments of the present disclosure. For those skilled in the art, other drawings can be obtained from these drawings without paying creative labor.

DESCRIPTION OF EMBODIMENTS

Figure 1:
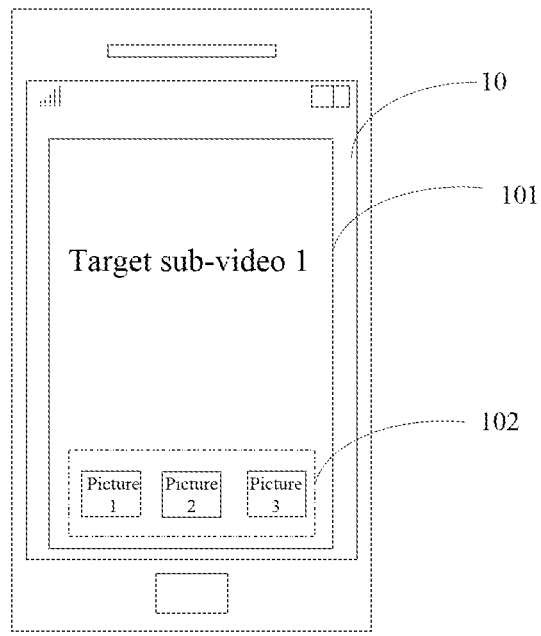
FIG. 1 is a schematic diagram of a user interface according to an embodiment of the present disclosure.

Embodiments of the present disclosure will be described in more detail below with reference to the drawings.

Although some embodiments of the present disclosure are shown in the drawings, it should be understood that the present disclosure can be implemented in various forms and should not be explained as being limited to the embodiments set forth herein. On the contrary, these embodiments are provided for a more thorough and complete understanding of the present disclosure. It should be understood that the drawings and embodiments of the present disclosure are merely used for exemplary purposes, and are not used to limit the protection scope of the present disclosure.

It should be understood that the various steps described in the method embodiments of the present disclosure may be performed in different sequences and/or in parallel. Furthermore, method embodiments may include additional steps and/or omit performing shown steps. The scope of the present disclosure is not limited in this regard.

The term "including" and variations thereof used herein are open-ended inclusions, i.e., "including but not limited to". The term "based on" used herein is "based at least in part on". The term "an embodiment" used herein represents "at least one embodiment"; the term "another embodiment" used herein represents "at least one another embodiment"; the term "some embodiments" used herein represents "at least some embodiments". Relevant definitions of other terms will be given in the description below.

It should be noted that the concepts such as "first" and "second" mentioned in the present disclosure are merely used to distinguish different apparatuses, modules or units, and are not used to limit sequence or interdependence of functions performed by these apparatuses, modules or units.

It should be noted that modifications of "a" and "a plurality of" mentioned in the present disclosure are illustrative rather than restrictive, those skilled in the art should understand that unless indicated in the context clearly, otherwise, they should be understood as "one or more".

Names of messages or information interacted between a plurality of apparatuses or modules in the embodiments of the present disclosure are only used for illustrative purposes, and are not used to limit the scope of these messages or information.

The video playback applications or video players in the prior art can only provide users with a single video in a playback interface, cannot provide other information, and at the same time, cannot provide users with convenient and rich functions, thereby affecting a user experience.

In order to solve the above problems, the technical conception of the present disclosure is to play a plurality of sub-videos while displaying a plurality of pictures in the user interface, and to correspond the displayed plurality of pictures to the plurality of sub-videos, thereby providing users with a convenience to view the plurality of target sub-videos and the plurality of corresponding pictures in a same user interface, which realizes a multi-functionality, and a linkage effect can be generated between the pictures and the target sub-videos, so that the user has a better viewing experience. In addition, it also supports that when the user clicks on a displayed picture, information associated with the picture may be jumped and displayed, which provides users with more functions through convenient operations, so that users can quickly and effectively obtain requirement information, which not only meets requirements of users, but also improves an operating experience of the user.

In a practical application, an execution body of the embodiment of the present disclosure may be a terminal device, such as a mobile terminal, a computer device (e.g., a desktop computer, a notebook computer, an all-in-one computer, etc.), and the like, the mobile terminal may include a smart phone, a handheld computer, a tablet computer, a wearable device with a display screen, and other mobile devices with playback functions. In a practical application, the displayed user interface may be used to play the target sub-video, and the target sub-video may be recommended for the user, or may be pushed randomly, which is not specifically limited in the present disclosure.

In a scene, referring to FIG. 1, FIG. 1 is a schematic diagram of a user interface according to an embodiment of the present disclosure. A terminal device may display a user interface 10 for playing a target sub-video, the user interface 10 is provided with a video playing area 101 and a picture display area 102, where a plurality of target sub-videos may be played in the video playing area 101 and a plurality of pictures may be displayed in the picture display area 102. Those skilled in the art should understand that a position and a size of the picture display area 102 may be set according to actual requirements. According to an embodiment of the present disclosure, a plurality of target sub-videos may be played while displaying the plurality of pictures in the picture display area 102.

The video processing method according to the embodiment of the present disclosure may be applied to a picture-video linkage scene, the picture-video linkage scene may include playing the target sub-videos sequentially corresponding to the pictures on the same interface while sequential displaying the pictures, and/or, supporting dynamic switching to the target sub-video corresponding to the picture when any picture is triggered, and playing the corresponding target sub-video at the same time. Taking an advertisement scene as an example, the picture display area 102 may display pictures of the plurality of commodities, and each picture includes at least one commodity; the sub-videos (for example, the sub-video includes the at least one commodity, and the sub-video may include a video advertisement of the at least one commodity, a usage video of the at least one commodity, etc., which is not limited in the present disclosure) corresponding to the at least one commodity are played sequentially in the video playing area 101. In addition, the video processing method according to the embodiment of the present disclosure may also be applied to a picture-related detail query scene. For example, when any picture is triggered, it is supported to dynamically switch to an associated target interface corresponding to the picture, and display associated target information corresponding to the picture. The present disclosure does not limit the application scenarios.

The technical solutions of the present disclosure will be described in detail below with specific embodiments. The following specific embodiments may be combined with each other, and the same or similar concepts or processes may not be repeated in some embodiments.

Figure 2:
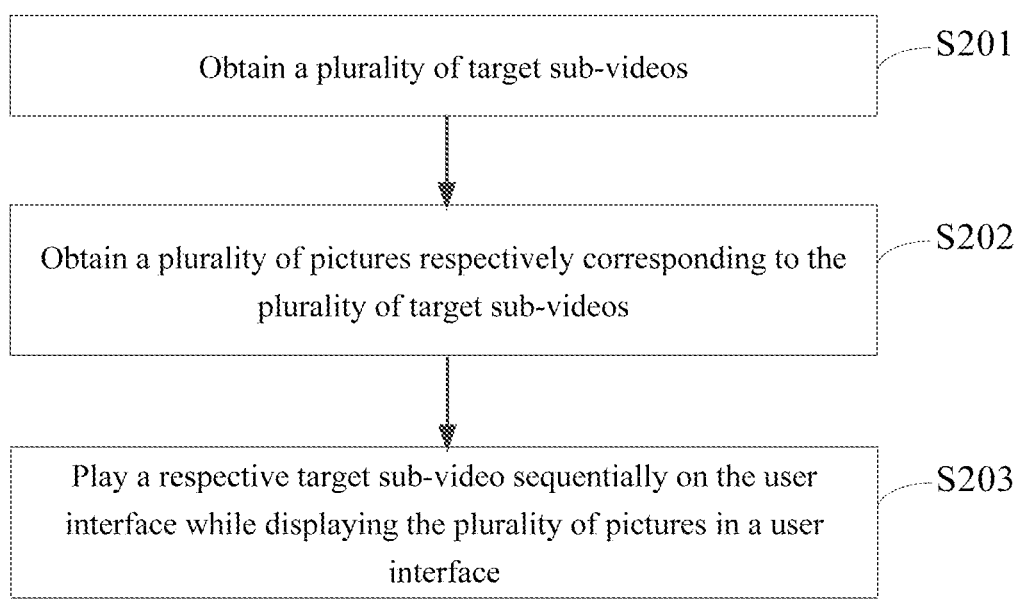
FIG. 2 is a schematic flowchart of a video processing method according to an embodiment of the present disclosure.

Referring to FIG. 2, FIG. 2 is a flowchart of a video processing method according to an embodiment of the present disclosure. The video processing method may include the following steps.

S201, obtain a plurality of target sub-videos.

S202, obtain a plurality of pictures respectively corresponding to the plurality of target sub-videos.

In an embodiment of the present disclosure, when a user viewing a video (hereinafter referred to as a user) opens an application, a terminal device may receive a plurality of videos delivered by a server, and the terminal device may filter the received plurality of videos, based on its own performance and/or network status to obtain the plurality of target sub-videos. The terminal device also receives the plurality of pictures sent by the server, and each picture corresponds to a filtered target sub-video, that is, the plurality of pictures are respectively corresponding to the plurality of target sub-videos. For example, for a target sub-video, the corresponding picture may include a picture related to content in the target sub-video. For example, if a target sub-video includes advertisement videos of one or more commodities, the corresponding pictures may include pictures of the one or more commodities; if a target sub-video includes a scenery short video recorded by shooting, the corresponding pictures may also include the pictures of shot scenic spots in the short video or pictures of a creator who shot the short video, etc. This disclosure does not limit this correspondence.

S203, play a respective target sub-video sequentially on the user interface while displaying the plurality of pictures in a user interface.

In an embodiment of the present disclosure, the user interface may provide the user with the playing of the plurality of target sub-videos and the displaying of the plurality of corresponding pictures. According to the obtained plurality of target sub-videos, the plurality of pictures, and a correspondence relationship between the plurality of target sub-videos and the plurality of pictures, the terminal device may display the plurality of pictures in the user interface and play the respective target sub-video sequentially at the same time, thereby generating a linkage effect between the video and the picture as shown in FIG. 1. Therefore, not only the multi-functionality of video playback is realized, but also a very rich viewing experience is provided for the user, thereby ensuring that the user's requirements are met, and the user's viewing experience is also improved at the same time.

In the video processing method provided by the embodiment of the present disclosure, a plurality of target sub-videos and a plurality of pictures respectively corresponding to the plurality of target sub-videos are obtained firstly, and then according to the obtained the plurality of target sub-videos and the plurality of pictures, while displaying the plurality of pictures in a user interface, the respective target sub-video may be played sequentially on the user interface, providing users with a convenience to view the plurality of target sub-videos and the plurality of pictures in a same user interface, which realizes a multi-functionality. At the same time, since the plurality of target sub-videos respectively corresponding to the plurality of pictures, a linkage effect can be generated between the pictures and the target sub-videos, so that users have a better viewing experience.

In an embodiment of the present disclosure, the plurality of target sub-videos played on the user interface may include a spliced video formed by the plurality of target sub-videos, or may include playing a target video by loading a next target sub-video. The plurality of target sub-videos played on the user interface may be described in detail below through at least two implementations.

Manner 1: in an embodiment, the plurality of target sub-videos played on the user interface may include the spliced video formed by the plurality of target sub-videos. For example, the terminal device may splice the plurality of target sub-videos into the target video, and record a playback sequence and a playback duration corresponding to the respective target sub-video in the target video.

The terminal device filters a plurality of videos, and creates asynchronous tasks for preprocessing and downloading the filtered videos respectively, and uses the preprocessed and downloaded videos as the plurality of target sub-videos. In a preprocessing process, a playback address with an appropriate definition and an appropriate code rate may be selected according to factors such as a performance of the terminal device and a network status.

In an embodiment of the present disclosure, the terminal device downloads all the target sub-videos to be spliced and stores them in a preset sequence, and then splices the target sub-videos to be spliced sequentially to generate the target video. For example, a mobile terminal may input the received plurality of sub-videos into a video synthesis model which is used to synthesis the plurality of target sub-videos into one target video for sequential splicing to generate the target video. In order to ensure that the playback sequence of a final synthesis video is the same as a delivery sequence, the terminal device may wait for all the sub-videos to be downloaded and then store them in sequence before storing the sub-videos. The terminal device inputs the received sub-videos into the video synthesis model for sequential splicing, and stores the generated target video in the memory of the terminal device. When playing the target video on the user interface, the terminal device may directly read the target video in the corresponding memory directory. The terminal device may also record the playback sequence and the playback duration corresponding to the respective target sub-video in the target video, so as to provide support for a jumping and playing between the respective target sub-videos, and provide support for a linkage technology for the respective target sub-video and the corresponding picture, to ensure a linkage effect.

In an embodiment of the present disclosure, on the basis of the manner 1, how to splice the target video is illustrated in detail, which may be achieved by the following steps.

Step a1, perform, according to a preset sequence, a sequential splicing operation on the plurality of target sub-videos to generate the target video.

Step a2, take the preset sequence as the playback sequence corresponding to the respective target sub-video.

In an embodiment of the present disclosure, the preset sequence here may be a storage sequence that stored in sequence after waiting for all sub-videos to be downloaded. Based on the storage sequence, the sequential splicing operation may be performed on the plurality of target sub-videos through a video synthesis model, thereby generating the target video.

Exemplarily, the video synthesis model may include a template of sub-videos to be added, the terminal device sequentially inputs the plurality of sub-videos into the template of sub-videos to be added in the video synthesis model. After the inputting operation is finished, the terminal device triggers a video splicing indication, which is used to indicate the video synthesis model to synthesize, in accordance with a sequence of inputting the plurality of sub-videos, the plurality of sub-videos in the template of the sub-video to be added into a long video, that is, to form the target video, the target video is a spliced video here.

In an embodiment of the present disclosure, on the basis of the manner 1, how to realize a sequential playing of the respective target sub-video on the user interface is illustrated in detail. Playing the respective target sub-video sequentially on the user interface may be achieved by the following steps.

Step b1, obtain the playback sequence and the playback duration corresponding to the respective target sub-video.

Step b2, play, according to the playback sequence and the playback duration, the respective target sub-video in the target video on the user interface.

In an embodiment of the present disclosure, after synthesizing the target video, the terminal device may record the playback sequence and the playback duration corresponding to the respective target sub-video in the target video, where a playback start time point of playing a next target sub-video in the target video may be determined according to the playback sequence and the playback duration. For example, taking the target video including three target sub-videos A1, B1, C1 as an example, for example, the playback sequence of A1, B1, C1 is a current sequence of A1, B1, C1 (that is, playing A1 first, then playing B1, and then playing C1), and the respective playback duration corresponding to A1, B1, and C1 is 20 s, 30 s, and 25 s. When the target video starts to play from the target sub-video A1, the playback start time point of A1 is the 0th second in the target video, the playback start time point of the target sub video B1 is the 20th second in the target video, and the playback start time point of the target sub video C1 is the 50th second in the target video. After the playing of C1 is completed, the terminal device may replay the target video in the user interface. Therefore, when the target video is played in a next round, it may be re-timed; the playback start time point of the target sub-video A1 is the 0th second in the target video, and so on. Thus, the terminal device plays the corresponding target sub-videos sequentially on the user interface based on the corresponding playback sequence and the corresponding playback duration of the respective target sub-video.

Manner 2, in an embodiment, the terminal device realizes the playback of the target video by loading a next target sub-video.

In an embodiment of the present disclosure, the terminal device realizes the sequential playback of the plurality of target sub-videos by preloading or loading the target sub-videos in real time. For example, when playing a first target sub-video, the terminal device may obtain a playback address of a second target sub-video in a video list pre-stored or delivered by a server and preload the second target sub-video, after the playing of the first target sub-video is completed, continue to play the preloaded second target sub-video; or, when the playing of the first target sub-video is completed, at the same time, the next target sub-video to be played is obtained for playing, and so on, to realize a playback of the target video in a way of switching the target sub-video in real time.

In an embodiment of the present disclosure, on the basis of the second manner, how to realize the sequential playback of the respective target sub-video on the user interface are illustrated in detail. The sequential playback of the respective target sub-video on the user interface may be achieved by the following steps.

For each target sub-video, according to the playback sequence, performing the following operations.

Step c1, obtain a playback address corresponding to a target sub-video.

Step c2, obtain a corresponding target sub-video from the obtained playback address, and obtaining a playback address of a next target sub-video while playing the corresponding target sub-video on the user interface.

In an embodiment of the present disclosure, the playback sequence of the respective target sub-video may be obtained, and the following operations may be performed for the respective target sub-video in accordance with the playback sequence: obtaining the playback address of the corresponding target sub-video, and obtaining the corresponding target sub-video through the playback address, and obtaining the playback address of a next target sub-video in accordance with the obtained playback sequence while playing the corresponding target sub-video on the user interface, and then repeating the above operations by analogy to realize sequential playback of the respective target sub-video on the user interface.

Specifically, after receiving a user's refresh operation on an information stream and before entering the user interface, the terminal device will preload a first segment of video (the first target sub-video) according to the playback address. The terminal device and preloads remaining target sub-videos in a background while playing the first segment of video. Before playing the video, the terminal device will dynamically select the playback address and a code rate to realize a best playback effect. After the first video is played, the terminal device will switch to play a second segment of video (the second target sub-video) in real time. In a case of successful preloading, the preloaded video data may be directly used for playing, reducing a stuck caused by a network reason. Similarly, after the second video is played, a third segment of video (a third target sub-video) will be switched and played in real time, and so on. When a last segment of the associated video is played, the terminal device may replay the first segment of video, thereby realizing an effect of playing the plurality of videos in a continuous loop.

In an embodiment of the present disclosure, on the basis of the above embodiment, a video processing method is illustrated in detail. The video processing method may further include: establishing, according to a correspondence relationship between a plurality of target sub-videos and a plurality of pictures, an association relationship between each target sub-video and a corresponding picture.

In an embodiment of the present disclosure, in order to realize a linkage between the plurality of target sub-videos and the plurality of pictures, the association relationship between the respective target sub-video and the corresponding picture may be established according to the correspondence relationship between each target sub-video and each picture. For example, taking the plurality of target sub-videos including three target sub-videos A1, B1, and C1, and the plurality of pictures including A11, B11, and C11 as an example, where A1 corresponds to A11, B1 corresponds to B11, and C1 corresponds to C11. By establishing indexes for the target sub-video and the corresponding picture, an association relationship between each target sub-video and the corresponding picture is generated according to this one-to-one correspondence relationship. According to the association relationship, the terminal device may realize a linkage display of each target sub-video and the corresponding picture at the same time.

In an embodiment of the present disclosure, the establishing, according to the correspondence relationship between the plurality of target sub-videos and the plurality of pictures, the association relationship between each target sub-video and the corresponding picture may be achieved by the following steps.

Step d1, store video information of a plurality of target sub-videos in a video list, and store picture information of a plurality of pictures in a picture list.

Step d2, establish, according to the correspondence relationship between the plurality of target sub-videos and the plurality of pictures, the association relationship between the respective target sub-video and the corresponding picture, through the video list and the picture list.

In an embodiment of the present disclosure, a mapping relationship between tables may be used to realize an establishment of the association relationship between contents in respective tables. Specifically, the video information of the plurality of target sub-videos (for example, one or more kinds of information in a playback sequence, a playback address, a playback duration, etc. of the plurality of target sub-videos) is stored in the video list, and at the same time, the picture information of the plurality of pictures (such as a storage address of the picture, etc.) are stored in the picture list. The association relationship between each target sub-video and the corresponding picture is established based on the correspondence relationship between each target sub-video and the corresponding picture (for example, there is a unique correspondence relationship between an identification of the target sub-video and an identification of the corresponding picture), through the video list and the picture list, thereby realizing an association between each target sub-video and the corresponding picture. In an embodiment, an index may be established for each target sub-video in the video list, and the target sub-video is mapped to a picture corresponding to the sub-video in the picture list through the index, so that the association relationship between each target sub-video and the corresponding picture is established. In addition, an index may also be established for each target picture in the picture list, and the picture is mapped to the target sub-video corresponding to the picture in the video list through the index, so that the association relationship between each target sub-video and the corresponding picture is established. The present disclosure does not limit the establishment of the association relationship. Therefore, through the established association relationship, a linkage between each target sub-video and the corresponding picture can be realized, instead of simply playing the video on the user interface, it provides users with more functions and display effects, and improves a user experience.

In an embodiment of the present disclosure, how to play the respective target sub-video sequentially on the user interface while displaying a plurality of pictures in a user interface is illustrated in detail. The video information may include a playback sequence of the plurality of target sub-videos; and the playing the respective target sub-video sequentially on the user interface while displaying the plurality of pictures in the user interface can be realized through the following steps.

Step e1, obtain the playback sequence in the video information.

Step e2, determine, according to the association relationship between the plurality of target sub-videos and the plurality of pictures, the playback sequence corresponding to the plurality of target sub-videos as an initial display sequence of pictures respectively corresponding to the plurality of target sub-videos.

Step e3, play, in accordance with the playback sequence, the respective target sub-video on the user interface, and adjust, according to a playback progress of the respective target sub-video, a display state of the plurality of pictures in the user interface.

In an embodiment of the present disclosure, the playback sequence of the plurality of target sub-videos is obtained from the video information firstly, and then the corresponding target sub-videos are searched in the video list according to the playback sequence, at the same time, the playback sequence of the plurality of target sub-videos are determined, according to the association relationship between the plurality of target sub-videos and the plurality of pictures, as an initial display sequence of pictures respectively corresponding to the plurality of target sub-videos, and then the respective target sub-video is displayed on the user interface in accordance with the playback sequence, and a display state of the plurality of pictures is adjusted in the user interface according to a playback progress of the respective target sub-video. Adjusting the display state of the plurality of pictures in the user interface may include (but is not limited to) at least one of the following: highlighting the picture corresponding to a currently playing target sub-video in a picture display area; adjusting a display position of the picture in the picture display area in accordance with a current playing progress.

This is illustrated by the following scenes.

Scene 1, highlight the picture corresponding to the currently playing target sub-video in the picture display area.

Figure 3:
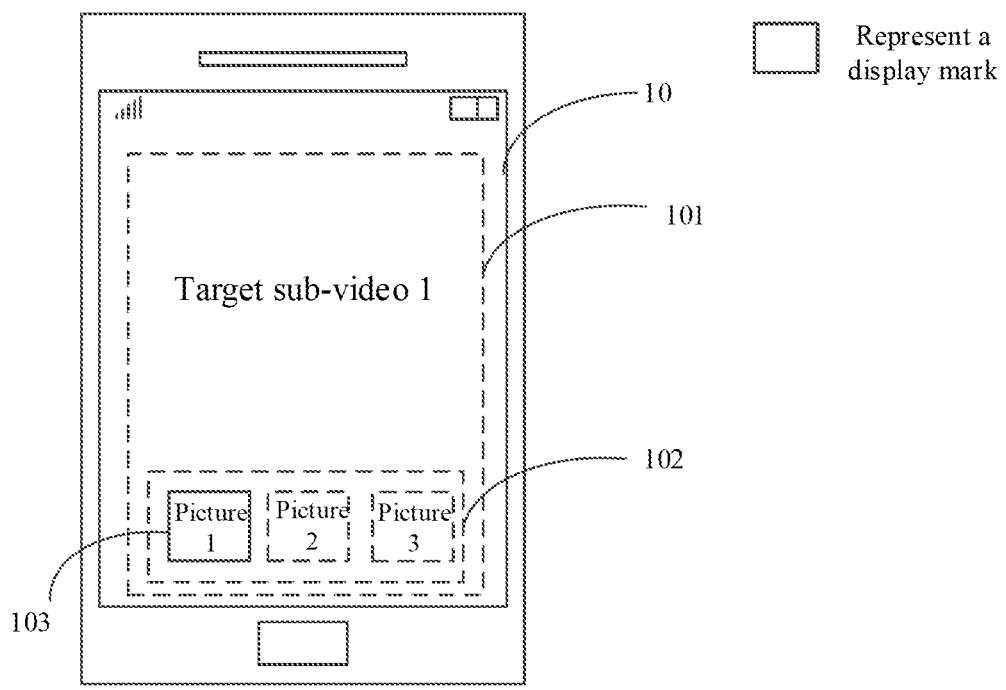
FIG. 3 is a schematic diagram of a scene of a video processing method according to an embodiment of the present disclosure.

In an embodiment of the present disclosure, in order to display which target picture in the picture display area corresponds to the currently playing target sub-video, the target picture corresponding to the currently playing target sub-video may be displayed in a highlighted manner. The highlighted manner may include (but not limited to): making a picture color of the target picture and/or a brightness of a location of the picture higher than other pictures; adding a display frame to the target picture, and the like. Referring to FIG. 3, a target sub-video 1 is currently playing on a user interface 10, a picture 1 is highlighted on a picture display area 102 through a display mark 103, the picture 1 is related to the target sub-video 1, i.e., the picture 1 corresponds to the target sub-video 1.

Scene 2, adjust, in accordance with a current playback progress, a display position of the picture in the picture display area.

In an embodiment of the present disclosure, due to an influence of a screen space of a terminal device, the picture display area may display a limited number of pictures (such as three, which is not limited here) on a current screen, and all pictures cannot be displayed on the picture display area at the same time. Therefore, in order to display all the pictures to the user, the terminal device may change and display corresponding pictures in the picture display area through a window sliding manner according to the playback progress of the respective target sub-video.

The window sliding manner includes: while the terminal device finishes playing the target sub-video corresponding to a last picture displayed in the current picture display area (for example, the picture on a rightmost in the picture display area), a first picture currently displayed in the picture display area (for example, a leftmost picture in the picture display area) is moved out of the picture display area with a window length of the picture display area occupied by one picture as a sliding step, and other pictures are moved (for example, moving left) in sequence. At this time, next second picture, third picture, and fourth picture are displayed in the picture display area, and the target sub-video 4 corresponding to the fourth picture is currently playing. By analogy, the terminal device may cyclically play the target sub-video and cyclically display a corresponding picture in the picture display area.

Figure 4:
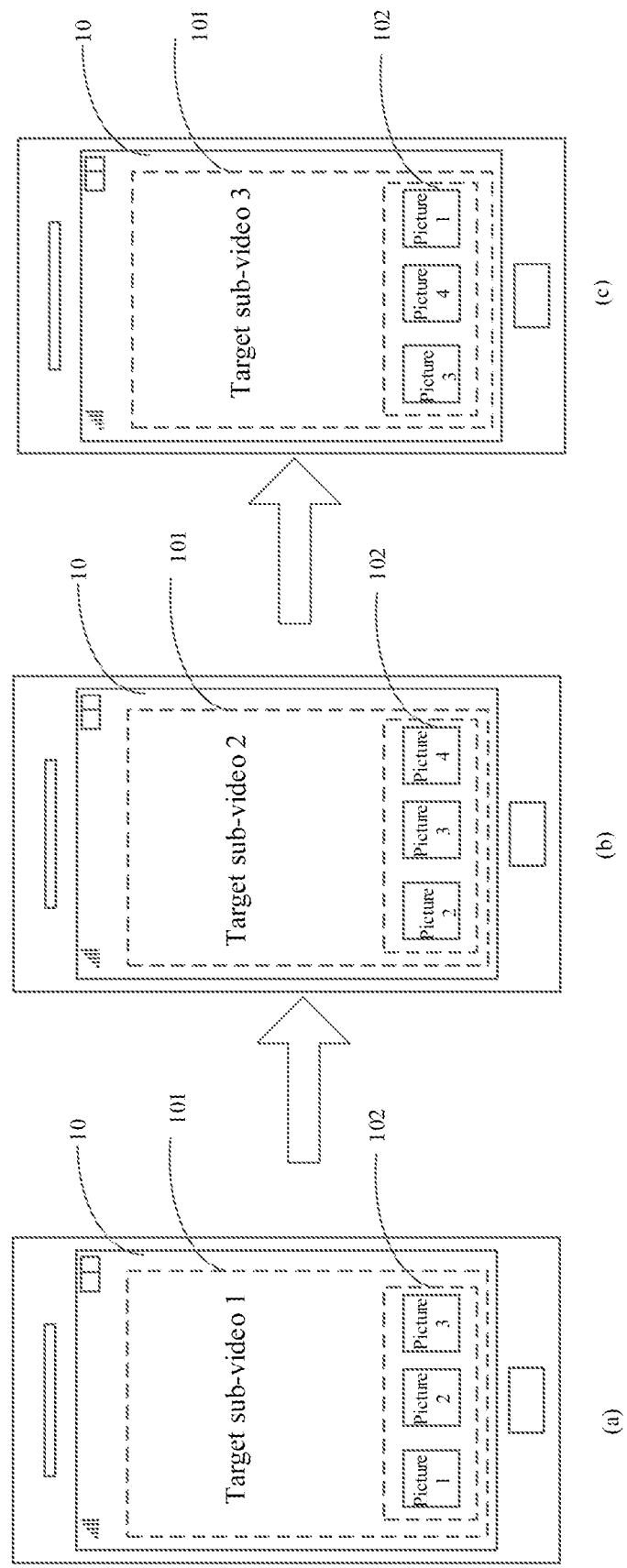
FIG. 4 is a schematic flowchart of a video processing method according to another embodiment of the present disclosure.

Exemplarily, as shown in FIG. 4, the target video includes 4 target sub-videos (a target sub-video 1, a target sub-video 2, a target sub-video 3 and a target sub-video 4), the plurality of pictures include 4 pictures (a picture 1, a picture 2, a picture 3 and a picture 4), three pictures may be displayed at the same time in the picture display area. After the user interface is opened, when the target sub-video 1, the target sub-video 2, and the target sub-video 3 are played in sequence, the picture 1 corresponding to the target sub-video 1, the picture 2 corresponding to the target sub-video 2 and the picture 3 corresponding to the target sub-video 3 are displayed in the picture display area 102. First, referring to (a) shown in FIG. 4, taking the target sub-video 3 currently being played as an example; referring to (b) in FIG. 4, when the target sub-video 3 is played, while continuing to play the target sub-video 4, a position of the respective picture in the picture display area 102 are adjusted, so that the picture 2, the picture 3 and the picture 4 corresponding to the target sub-video 4 are displayed in the picture display area; referring to (c) in FIG. 4, when the target sub-video 4 is played, while continuing to play the target sub-video 1, the position of the respective picture in the picture display area 102 are adjusted, so that the picture 3, the picture 4 and the picture 1 are displayed in the picture display area 102. By analogy, the terminal device may cyclically play the target sub-video and cyclically display the corresponding picture in the picture display area.

In addition, another window sliding manner may include: when a target sub-video is played, while playing the next target sub-video, the first picture currently displayed in the picture display area is moved out of the picture display area with the window length of the picture display area occupied by one picture as the sliding step, and other pictures are moved in sequence. At this time, the first picture displayed in the picture display area is the picture corresponding to the currently playing target sub-video. By analogy, the terminal device may cyclically play the target sub-video and cyclically display the corresponding picture in the picture display area.

Figure 5:
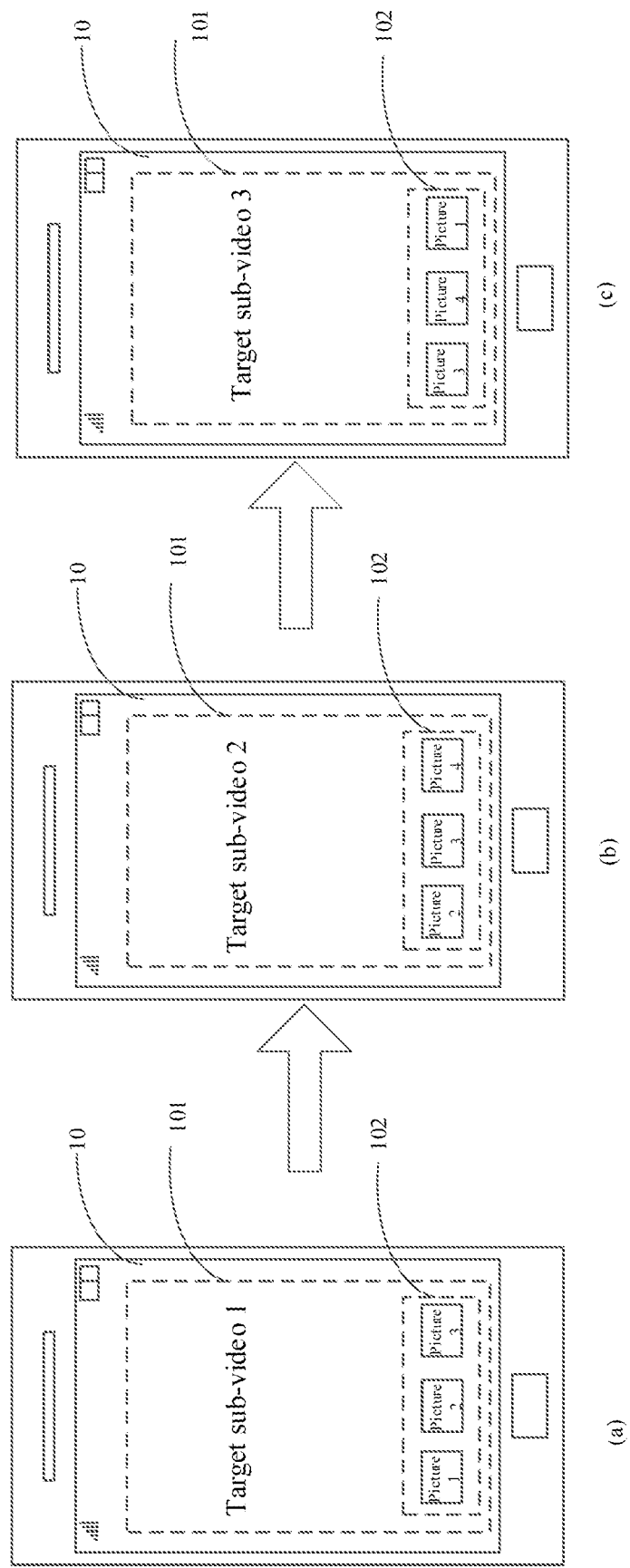
FIG. 5 is a schematic diagram of a scene of a video processing method according to yet another embodiment of the present disclosure.

Exemplarily, the target video includes 4 target sub-videos (the target sub-video 1, the target sub-video 2, the target sub-video 3 and the target sub-video 4), and the plurality of pictures include 4 pictures (the picture 1, the picture 2, the picture 3 and picture 4), three pictures may be displayed at the same time in the picture display area. Referring to FIG. 5(a), after the user interface is opened, while playing the target sub-video 1, the picture 1 corresponding to the target sub-video 1, the picture 2 corresponding to the target sub-video 2 and the picture 3 corresponding to the target sub-video 3 are displayed in the picture display area; referring to shown in FIG. 5(b), when the target sub-video 1 is played, while continuing to play the target sub-video 2, a position of the respective picture in the picture display area are adjusted, so that the picture 2, the picture 3 and the picture 4 corresponding to the target sub-video 4 are displayed in the picture display area; referring to (c) in FIG. 5, when the target sub-video 2 is played, while continuing to play the target sub-video 3, the position of the respective picture in the picture display area are adjusted, so that the picture 3, the picture 4 and the picture 1 are displayed in the picture display area. By analogy, the terminal device may cyclically play the target sub-video and cyclically display the corresponding picture in the picture display area.

Figure 6:
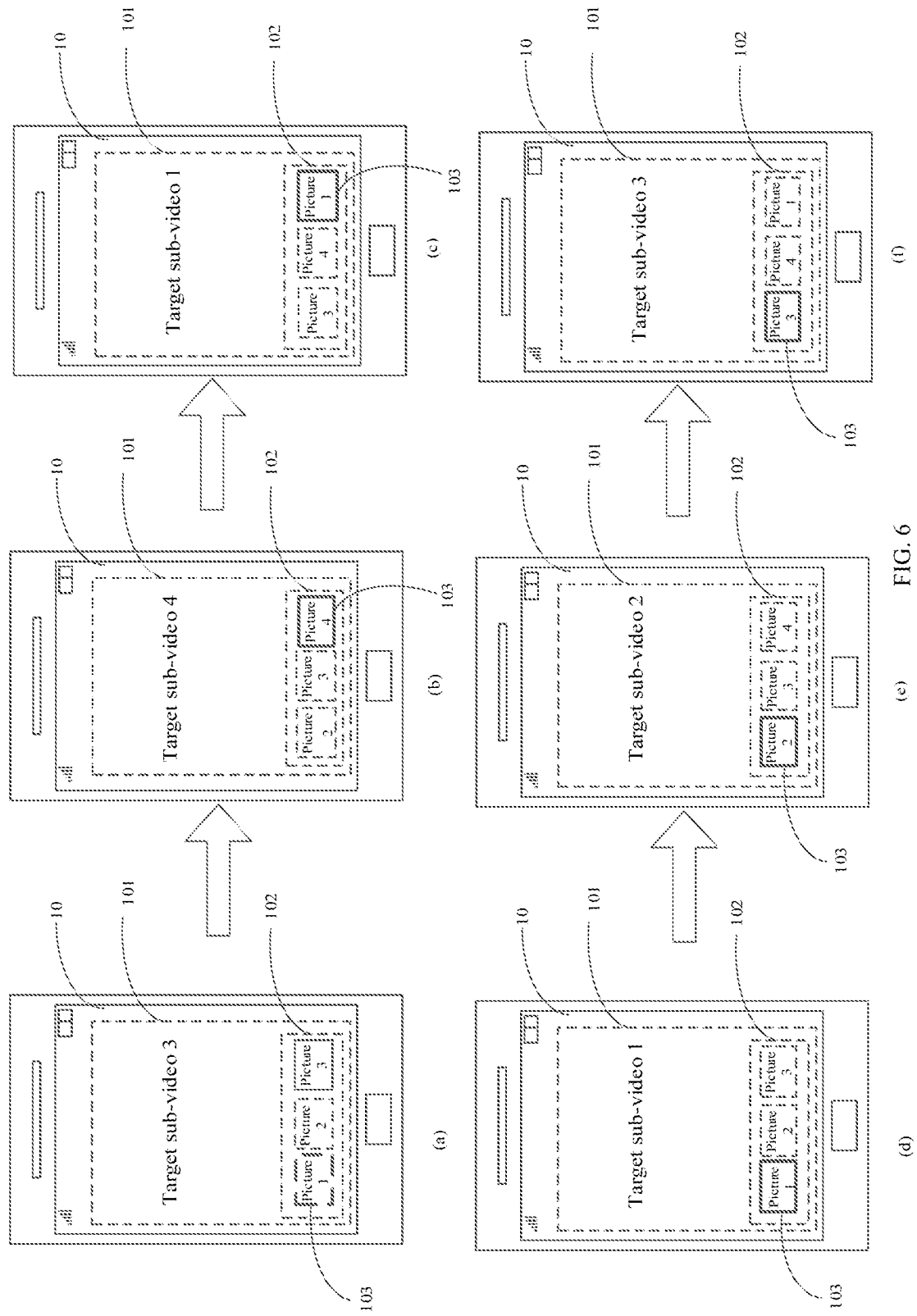
FIG. 6 is a schematic diagram of a scene of a video processing method according to yet still another embodiment of the present disclosure.

Scene 3, while highlighting the picture corresponding to the current playing target sub-video in the picture display area, adjust, in accordance with the current playback progress, the display position of the picture in the picture display area, that is, a combination of the above scene 1 and scene 2. Referring to FIG. 6, a specific implementation manner may refer to descriptions of scene 1 and scene 2, which will not be repeated here.

In an embodiment of the present disclosure, a video processing method is illustrated in detail. The video processing method may further include:

jumping and displaying, in response to a triggering operation acting on a target picture in a plurality of pictures on a user interface, target information associated with a target picture, where the target picture includes any picture in the plurality of pictures, and the target information includes static information or dynamic information associated with the target picture.

In an embodiment of the present disclosure, the target information here may include the static information or the dynamic information associated with the target picture. Therefore, when monitoring an triggering operation on any picture in the plurality of pictures, i.e., the target picture, in response to the triggering operation, the target sub-video corresponding to the target picture may be jumped from the target sub-video currently played on the current interface (i.e., the user interface), and a target interface may also be jumped to, the static information associated with the target picture is displayed on the target interface or the dynamic information associated with the target picture is played on the target interface (the dynamic information here may be a video related to the target picture, such as a target sub-video corresponding to the target picture or other videos associated with the target picture, which are not specifically limited here). The target interface here may include other interfaces different from the user interface. Detailed illustration is given by the following two examples (Example 1 and Example 2).

Example 1, for a scene where the target sub-video corresponding to the target picture is played by jumping from the target sub-video currently played on the user interface.

The video processing method may include: jumping and displaying, in response to a first triggering operation acting on a target picture, a first target sub-video corresponding to the target picture through the association relationship, where the target picture includes any picture in the plurality of pictures.

Specifically, it may be achieved in at least two manners as following.

One manner may be implemented on a basis of the above-mentioned manner 1. For example, in response to the triggering operation of the user on the target picture, the terminal device searches for corresponding target sub-video information in the video list according to an index of the target picture, obtains information such as a playback sequence and a playback duration in a video information, and then calls a system interface of a video player to automatically jump to a specified time point to start playing, so as to realize a linkage switching effect between the picture and the target sub-video.

Another manner may be implemented on a basis of the above-mentioned manner 2. In response to the triggering operation of the user on the target picture, the terminal device searches for corresponding target sub-video information in the video list according to an index of the target picture, obtains a playback address in the video information, and calls the player's playback method to play the target sub-video, so as to realize a linkage switching effect between the picture and the corresponding target sub-video.

In an embodiment of the present disclosure, how to jump and display the first target sub-video corresponding to the target picture through the association relationship is illustrated in detail. The jumping and displaying, in response to a first triggering operation acting on a target picture, a first target sub-video corresponding to the target picture through the association relationship may be realized through the following steps.

Step f1, determine, in response to the first triggering operation acting on the target picture, the first target sub-video corresponding to the target picture through the association relationship.

Step f2, search video information of the first target sub-video in the video list, where the video information includes at least one of a playback sequence, a playback duration, and a playback address of the first target sub-video; and play, according to the video information corresponding to the first target sub-video, the first target sub-video.

When the target video is realized by the above manner 1, the video information includes the playback sequence and the playback duration of the corresponding target sub-videos. In response to the triggering operation of the user on the target picture, the terminal device searches for the corresponding first target sub-video information in the video list according to the index of the target picture, obtains the playback sequence and the playback duration in the video information, adjusts to jump and play the first target sub-video information according to the playback sequence and the playback duration corresponding to the first target sub-video, so as to realize a linkage switching effect between the picture and the corresponding first target sub-video.

When the target video is played in the above manner 2, the video information includes the playback address of the corresponding target sub-video. In response to the triggering operation of the user on the target picture, the terminal device searches for the corresponding target sub-video information in the video list according to the index of the target picture, obtains the playback address in the video information, and obtains and plays the target sub-video according to the playback address, so as to realize a linkage switching effect between the picture and the corresponding target sub-video.

Figure 7:
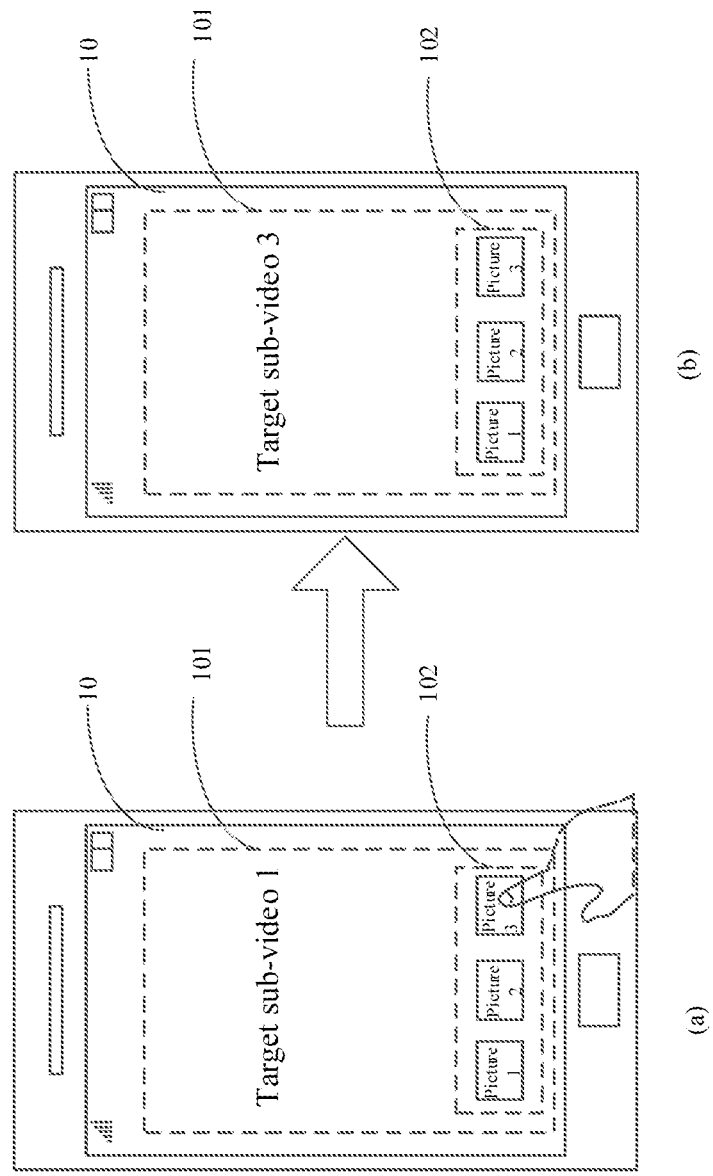
FIG. 7 is a schematic diagram of a scene of a video processing method according to another embodiment of the present disclosure.

Exemplarily, as shown in FIG. 7, if a target sub-video 1 is currently being played, when a user wants to view a target sub-video 3 corresponding to a picture 3, as shown in FIG. 7(a), the user may click the picture 3. When the terminal device detects a triggering operation acting on the picture 3, in response to the triggering operation acting on the picture 3, a first target sub-video corresponding to the picture 3 is determined as the target sub-video 3 through the association relationship. The video information of the first target sub-video is searched in a video list, so as to realize a jumping and playing of the target sub-video 3 on the user interface, as shown in FIG. 7(b).

On a basis of FIG. 7, the picture 3 corresponding to the currently playing target sub-video 3 may also be highlighted by a display mark in combination with the above scene 1. In addition, while jumping to display, a display state of the picture in the picture display area is adjusted in combination with the above scene 2. The jumping and displaying may be also realized in combination with the above scene 3, etc. The specific implementations may be combined with the above scene 1, scene 2 and scene 3, and will not be repeated here.

In an embodiment, since the number of pictures that can be displayed at the same time in the picture display area is limited, when the user wants to view the pictures that are not currently displayed in the picture display area and the corresponding target sub-videos, a synchronous display of the picture and the corresponding target sub-video on the user interface may be realized through the triggering operation, such as the sliding operation, in the picture display area, so that more pictures and sub-videos can be viewed, thereby meeting the user's requirements of a personalized viewing or watching.

Figure 8:
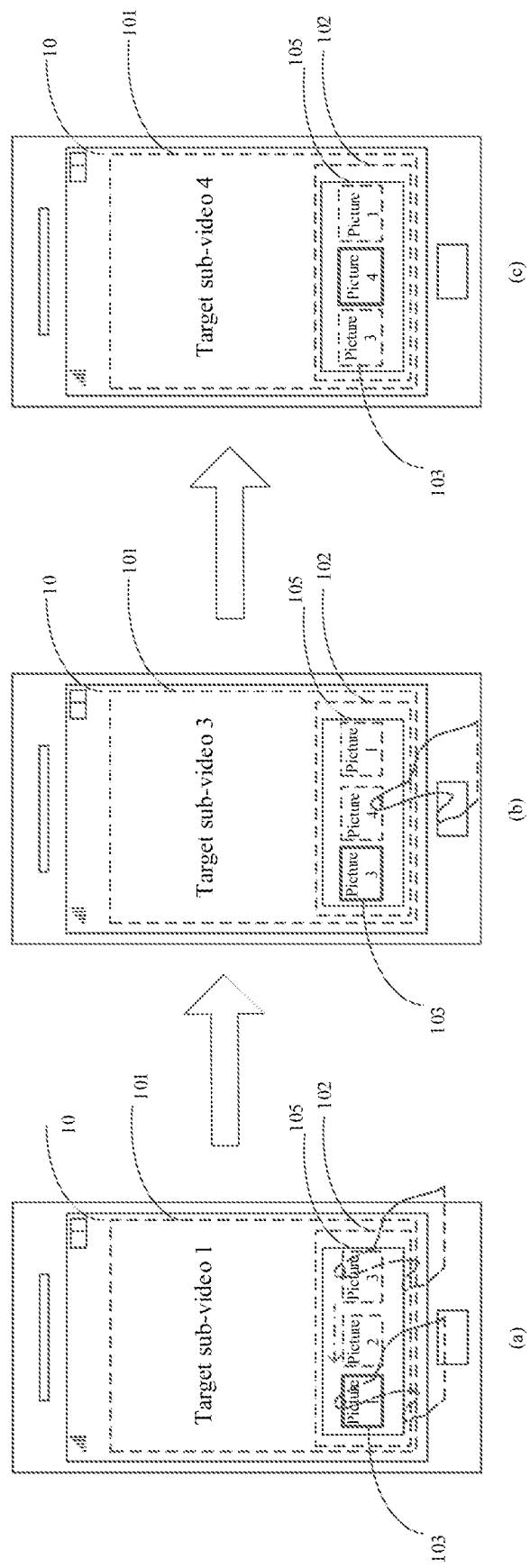
FIG. 8 is a schematic diagram of a scene of a video processing method according to yet another embodiment of the present disclosure.

Combining with an example of scene 2, a sliding area 105 (a position of the picture display area where the sliding area is located is not specifically limited, or the sliding area may not be set, and it may slide anywhere on the picture display area) may be set in the picture display area, taking a sliding area 105 is set as an example, as shown in FIG. 8. As shown in FIG. 8(a), a target sub-video 1 is currently playing on a user interface, a user releases and displays a picture 3 in a picture display area 102 by a sliding left operation and a releasing operation on the picture display area 102. The terminal device jumps to play a target sub-video 3 on the user interface 10, at the same time, the picture displayed in the picture display area is adjusted, as shown in FIG. 8(b), the terminal device displays the picture 3 in a leftmost of the picture display area 102, at the same time, the target sub-video 3 is played in the user interface 10; when the user wants to view or watch a target sub-video 4 corresponding to a picture 4, similarly, a trigger operation acted on the picture 4 may enable the target sub-video 4 is jumped and played on the user interface, as shown in FIG. 8(c). A convenient operation is provided for the user, so that the user can view any picture and the corresponding target sub-video at any time.

Example 2, for jumping and displaying the target interface, and playing the static information or the dynamic information corresponding to the target picture on the target interface. The static information here may include static information such as landing pages, such as pictures, texts, or a combination of pictures and texts associated with the target picture.

In a practical application, the target interface here may include a detail page of the picture or other picture detail pages associated with the picture, or a link or thumbnail to enter the detail page, and the detail page may include: a page contains pictures or text information associated with pictures; contents specifically included in the target interface is not specifically limited here. The target interface may display video, static information, or both video and static information.

Figure 9:
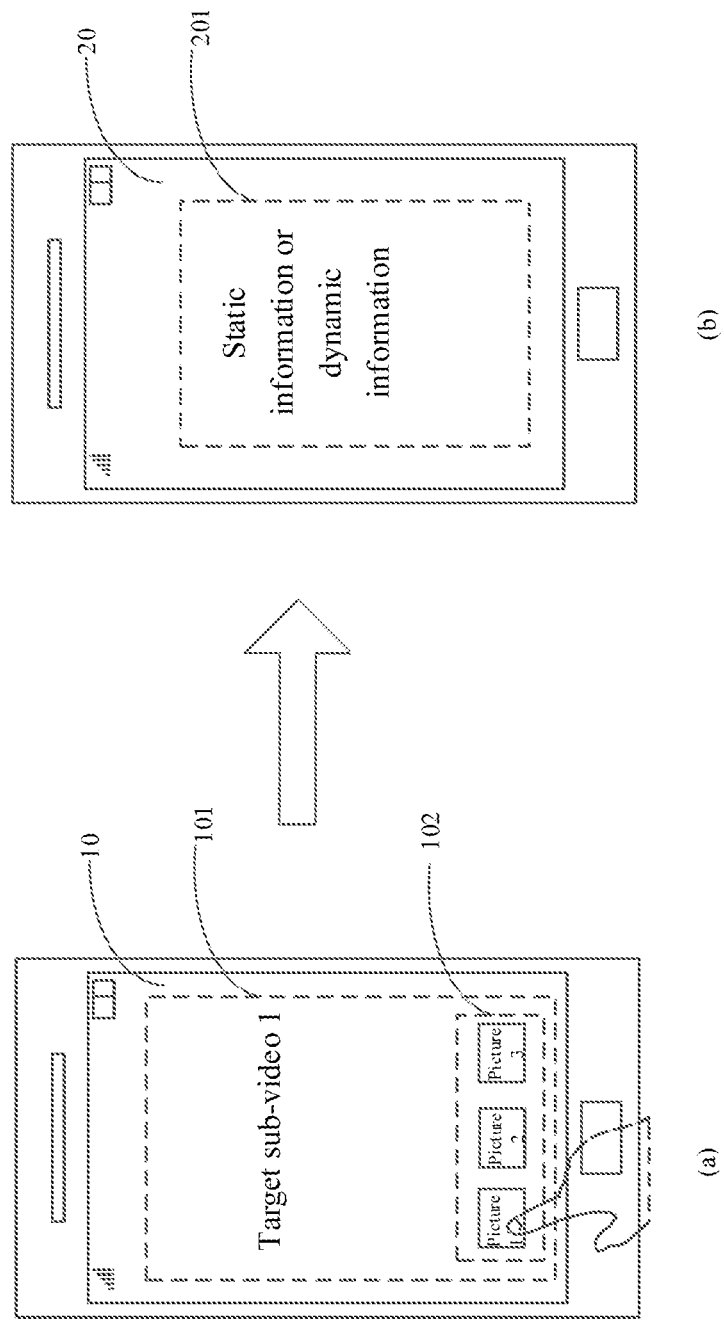
FIG. 9 is a schematic scene diagram of a video processing method according to another embodiment of the present disclosure.

In an embodiment of the present disclosure, when a user wants to query or know relevant information (such as the static information, the dynamic information, etc.) of any picture in the picture display area, the corresponding picture (i.e., the target picture, see the target picture shown in FIG. 9(a) is picture 1) may be triggered directly, that is, an associated interface, i.e., a target interface 20 associated with the target picture, corresponding to the target picture may be jumped and displayed. The target interface 20 is used to display the static information or the dynamic information 201 (the dynamic information here may be a video related to the target picture) associated with the target picture, as shown in FIG. 9. In an embodiment, a scene 1, a scene 2, or a scene 3 or a combination of the above-mentioned scenes may also be combined on a basis of FIG. 9. A specific implementation method may refer to the scene 1, the scene 2, or the scene 3, which is not repeated here.

Taking the target picture including a certain product as an example, associated static information may include a details page of the product or a link corresponding to the product. Detailed information of the product may be provided for a user in the details page, and the user may enter the details page of the product or a homepage associated to the product through the link. The dynamic information associated with the target picture may also be displayed on the target interface. The dynamic information may include a video advertisement of the product, a using video of the product, and the like, which are not limited in the present disclosure.

In addition, those skilled in the art should understand that the "triggering" operation in the present disclosure may include (but is not limited to): a click triggering, that is, the user clicks a corresponding button or any position in the interface to realize a triggering; a gesture triggering, the user makes corresponding gestures to realize the triggering operation; a voice triggering, that is, the user issues corresponding voice commands to realize the triggering operation; an expression triggering, that is, the triggering operation is realized by making a corresponding expression, and the like. The triggering operation is not limited in the present disclosure.

Therefore, the present disclosure can realize an ability to aggregate and display a plurality of related videos in a single video, and at the same time, realize a linkage of pictures associated with the video, thereby improving an attractiveness of a video content. In addition, the target video recommended by the present disclosure can satisfy a personalized requirement of the user, and provide users with convenient operations, so that users can quickly and effectively obtain demand information, realize a multi-functional and a rich viewing experience, and improve an operating experience of the user.

Figure 10:
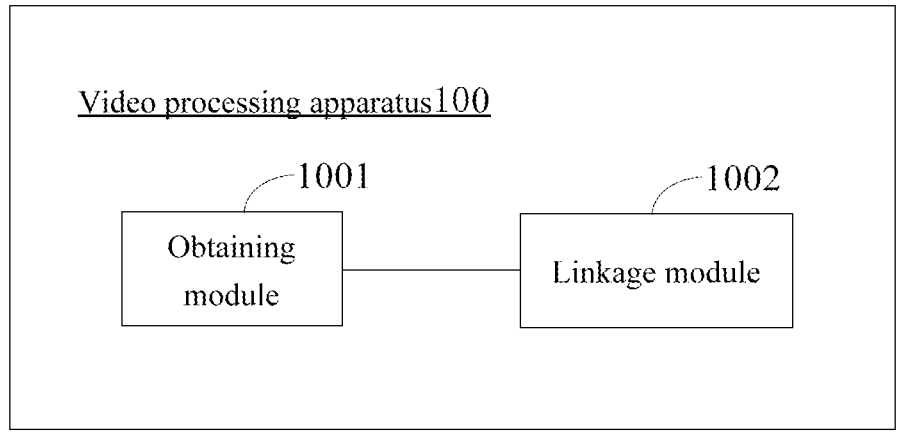
FIG. 10 is a structural block diagram of a video processing apparatus according to an embodiment of the present disclosure.

Corresponding to the video processing method of the above disclosed embodiments, FIG. 10 is a structural block diagram of a video processing apparatus according to an embodiment of the present disclosure. The video processing apparatus may include a terminal device. For convenience of illustration, only the parts related to the embodiments of the present disclosure are shown. Referring to FIG. 10, the video processing apparatus 100 may include: an obtaining module 1001, a linkage module 1002; the obtaining module 1001 is configured to obtain a plurality of target sub-videos, and also configured to obtain a plurality of pictures respectively corresponding to the plurality of target sub-videos; the linkage module 1002 is configured to play a respective target sub-video sequentially on the user interface while displaying the plurality of pictures in a user interface.

The obtaining module 1001 and the linkage module 1002 provided in the embodiment of the present disclosure are configured to obtain the plurality of target sub-videos and the plurality of pictures respectively corresponding to the plurality of target sub-videos, and then, according to the obtained plurality of target sub-videos and the plurality of pictures, the respective target sub-video may be played sequentially on the user interface while displaying the plurality of pictures in a user interface, providing users with a convenience to view the plurality of target sub-videos and the plurality of pictures in a same user interface, which realizes a multi-functionality. At the same time, since the plurality of target sub-videos respectively corresponding to the plurality of pictures, a linkage effect can be generated between the pictures and the target sub-videos, so that users have a better viewing experience.

The apparatus provided by an embodiment of the present disclosure may be used to execute the technical solution of the video processing method embodiment described in any one of the above first aspect, and the implementation principles and the technical effects therebetween are similar, and are not repeated in the embodiment of the present disclosure.

In an embodiment of the present disclosure, the embodiment of the present disclosure illustrates the video processing apparatus in detail on a basis of the above disclosed embodiments. The video processing apparatus further includes: a video splicing module, configured to splice the plurality of target sub-videos into a target video, and record a playback sequence and a playback duration corresponding to the respective target sub-video in the target video.

In an embodiment of the present disclosure, the video splicing module may be configured to: perform, according to a preset sequence, a sequential splicing operation on the plurality of target sub-videos to generate the target video; and take the preset sequence as the playback sequence corresponding to the respective target sub-video.

In an embodiment of the present disclosure, the linkage module 1002 is configured to: obtain the playback sequence and the playback duration corresponding to the respective target sub-video; and play, according to the playback sequence and the playback duration, the respective target sub-video in the target video on the user interface.

In an embodiment of the present disclosure, the linkage module 1002 is further configured to: for each target sub-video, according to the playback sequence, perform the following operations: obtain a playback address corresponding to a target sub-video; obtain a corresponding target sub-video from the obtained playback address, and obtain a playback address of a next target sub-video while playing the corresponding target sub-video on the user interface.

In an embodiment of the present disclosure, the embodiment of the present disclosure illustrates the video processing apparatus in detail on a basis of the above disclosed embodiments. The apparatus may further include: an association relationship establishing module; the association relationship establishing module is configured to establish, according to a correspondence relationship between the plurality of target sub-videos and the plurality of pictures, an association relationship between each target sub-video and a corresponding picture.

In an embodiment of the present disclosure, the association relationship establishing module is configured to: store video information of the plurality of target sub-videos in a video list, and storing picture information of the plurality of pictures in a picture list; establish, according to the correspondence relationship between the plurality of target sub-videos and the plurality of pictures, the association relationship between the respective target sub-video and the corresponding picture, through the video list and the picture list.

In an embodiment of the present disclosure, the video information includes the playback sequence of the plurality of target sub-videos, and the linkage module 1002 is further configured to: obtain the playback sequence in the video information; determine, according to the association relationship between the plurality of target sub-videos and the plurality of pictures, the playback sequence corresponding to the plurality of target sub-videos as an initial display sequence of pictures respectively corresponding to the plurality of target sub-videos; and play, in accordance with the playback sequence, the respective target sub-video on the user interface, and adjust, according to a playback progress of the respective target sub-video, a display state of the plurality of pictures in the user interface.

The embodiment of the present disclosure illustrates an apparatus in detail on a basis of the above disclosed embodiments. The apparatus may further include: a trigger operation responding module; the trigger operation responding module is configured to, jump and display, in response to a first triggering operation acting on a target picture, a first target sub-video corresponding to the target picture through the association relationship, where the target picture includes any picture in the plurality of pictures.

The embodiment of the present disclosure is based on the above disclosed embodiments, the trigger operation responding module is configured to: determine, in response to the first triggering operation acting on the target picture, the first target sub-video corresponding to the target picture through the association relationship; search video information of the first target sub-video in the video list, where the video information includes at least one of a playback sequence, a playback duration, and a playback address of the first target sub-video; and play, according to the video information corresponding to the first target sub-video, the first target sub-video.

The embodiment of the present disclosure is based on the above disclosed embodiments, the trigger operation responding module is further configured to: jump and display, in response to a triggering operation acting on a target picture in the plurality of pictures on the user interface, target information associated with the target picture, where the target picture includes any picture in the plurality of pictures, and the target information includes static information or dynamic information associated with the target picture.

The above modules may be implemented as software components executing on one or more general-purpose processors, may also be implemented as hardware, such as programmable logic devices and/or application specific integrated circuits, that perform certain functions or combinations thereof. In some embodiments, the modules may be embodied in a form of a software product that may be stored in a non-volatile storage medium, including a method for enabling a computer device (for example, a personal computer, a server, a network device, a mobile terminal, etc.) to implement the method described in the embodiments of the present disclosure. In an embodiment, the above modules may also be implemented on a single device, or may be distributed on a plurality of devices. The functions of these modules may be combined with each other, or further split into a plurality of sub-modules.

Those skilled in the art may clearly understand that, for the convenience and brevity of description, a specific working process of the modules of the video processing apparatus described above, may refer to a corresponding process in the foregoing method embodiments, which will not be repeated here.

Based on the same inventive concept as the method, an embodiment of the present disclosure further provides an electronic device, including a processor and a memory;
the memory is configured to store programs for executing the methods described in the above method embodiments; the processor is configured to execute the programs stored in the memory.

Figure 11:
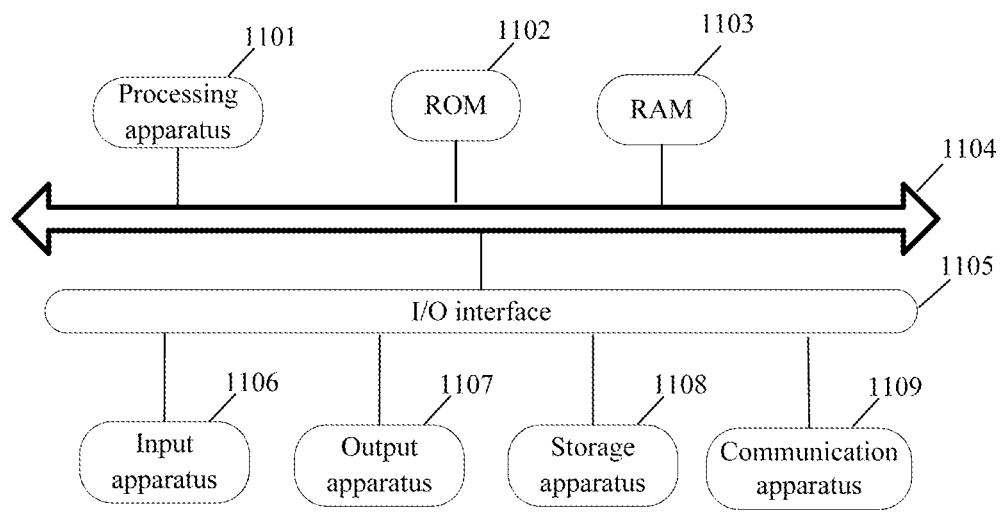
FIG. 11 is a schematic diagram of a hardware structure of an electronic device according to an embodiment of the present disclosure.

Referring to FIG. 11, which shows a schematic structural diagram of an electronic device suitable for implementing an embodiment of the present disclosure, the electronic device may be a terminal device or a server. The electronic device includes a processor and a memory; the memory is configured to store programs for executing the methods described in the above method embodiments; the processor is configured to execute the programs stored in the memory. The processor may be a processing unit including a central processing unit (CPU) or other forms of processing unit with a data processing capability and/or an instruction execution capability, and may control other components in the electronic device to perform desired functions. The memory may include one or more computer program products, which may include various forms of computer readable storage media, such as a volatile memory and/or a non-volatile memory. The volatile memory may include, for example, a random access memory (RAM) and/or a cache (cache), etc. The non-volatile memory may include, for example, a read-only memory (ROM), a hard disk, a flash memory, and the like. One or more computer program instructions may be stored on the computer readable storage medium, which may be executed by the processor to implement the functions of the embodiments of the present disclosure described above and/or other desired functions.

A terminal device may include, but are not limited to, a mobile terminal, such as a mobile phone, a notebook computer, a digital broadcast receiver, a personal digital assistant (PDA), a tablet computer (PAD), a portable multimedia player (PMP), an in-vehicle terminal (for example, an in-vehicle navigation terminal), a wearable electronic device, and a stationary terminal such as a digital TV, a desktop computer, and the like. The electronic device shown in FIG. 11 is only an example, and should not impose any restriction on a function and a scope of use of the embodiments of the present disclosure.

As shown in FIG. 11, the electronic device may include a processing apparatus (for example, the central processing unit, a graphics processor, etc.) 1101, which may perform various appropriate actions and processes according to a program stored in a read-only memory (ROM) 1102 or a program loaded from a memory apparatus 1108 into a random access memory (RAM) 1103. In the RAM 1103, various programs and data required for an operation of the electronic device are also stored. The processing apparatus 1101, the ROM 1102, and the RAM 1103 are connected to each other through a bus 1104. An input/output (I/O) interface 1105 is also connected to the bus 1104.

Generally, the following apparatuses may be connected to the I/O interface 1105: an input apparatus 1106, including for example a touch screen, a touch panel, a keyboard, a mouse, a camera, a microphone, a accelerometer, a gyroscope, and the like; an output apparatus 1107, including for example a liquid crystal display (LCD), a speaker, a vibrator, and the like; a storage apparatus 1108, including for example a magnetic tape, a hard disk, and the like; and a communication apparatus 1109. The communication apparatus 1109 may allow the electronic device to perform wireless or wired communication with other devices to exchange data. Although FIG. 11 shows the electronic device with multiple kinds of apparatuses, it is not required to implement or have all the apparatuses. It may alternatively be implemented or provided with more or fewer apparatuses.

In particular, according to an embodiment of the present disclosure, the process described above with reference to the flowchart may be implemented as a computer software program. For example, an embodiment of the present disclosure includes a computer program product, which includes a computer program carried on a computer readable medium, and the computer program contains program codes for executing the method shown in the flowchart. In such an embodiment, the computer program may be downloaded from a network and installed through the communication apparatus 1109, or installed from the storage apparatus 1108, or installed from the ROM 1102. When the computer program is executed by the processing apparatus 1101, the above-mentioned functions defined in the method of the embodiment of the present disclosure are executed.

It should be noted that, the above-mentioned computer readable medium in the present disclosure may be a computer readable signal medium or a computer readable storage medium or any combination of the both. The computer readable storage medium may be, for example, but not limited to, an electrical, magnetic, optical, electromagnetic, infrared, or semiconductor system, apparatus or device, or any combination of the above. More specific examples of the computer readable storage medium may include, but are not limited to: an electrical connection with one or more wires, a portable computer disk, a hard disk, a random access memory (RAM), a read only memory (ROM), an erasable programmable read-only memory (EPROM), or flash memory an optical fiber, a compact disc read-only memory (CD-ROM), an optical storage device, a magnetic storage device, or any suitable combination of the above. In the present disclosure, the computer readable storage medium may be any tangible medium that contains or stores a program, and the program may be used by or in combination with an instruction execution system, apparatus, or device. In the present disclosure, a computer readable signal medium may include a data signal propagated in a baseband or propagated as a part of a carrier wave, and a computer readable program code is carried therein. This propagated data signal may adopt many forms, including but not limited to, an electromagnetic signal, an optical signal, or any suitable combination of the above. The computer readable signal medium may also be any computer readable medium other than the computer readable storage medium, the computer readable signal medium may send, propagate, or transmit the program used by or in combination with the instruction execution system, apparatus, or device. The program code contained on the computer readable medium may be transmitted by any suitable medium, including but not limited to: a wire, an optical cable, a radio frequency (RF), etc., or any suitable combination of the above.

The above-mentioned computer readable medium may be included in the above-mentioned terminal device; or it may exist alone without being assembled into the electronic device.

The above-mentioned computer readable medium carries one or more programs, and when the above-mentioned one or more programs are executed by the electronic device, the electronic device is caused to execute the method shown in the above-mentioned embodiments.

The computer program code used to perform operations of the present disclosure may be written in one or more programming languages or a combination thereof. The above-mentioned programming languages include an object-oriented programming language—such as Java, Smalltalk, C++, and also include a conventional procedural programming language—such as "C" language or similar programming language. The program code may be executed entirely on a computer of a user, partly on a computer of a user, executed as an independent software package, partly executed on a computer of a user and partly executed on a remote computer, or entirely executed on a remote computer or server. In a case where a remote computer is involved, the remote computer may be connected to the computer of the user through any kind of network—including a local area network (LAN) or a wide area network (WAN), or, it may be connected to an external computer (for example, connected via the Internet through an Internet service provider).

The flowcharts and block diagrams in the accompanying drawings illustrate possible implementation architecture, functions, and operations of the system, method, and computer program product according to the embodiments of the present disclosure. In this point, each block in the flowchart or block diagram may represent a module, a program segment, or a part of code, and the module, the program segment, or the part of code contains one or more executable instructions for implementing a designated logical function. It should also be noted that, in some alternative implementations, the functions marked in the blocks may also occur in a different order from the order marked in the drawings. For example, two blocks shown one after another may actually be executed substantially in parallel, or sometimes may be executed in a reverse order, which depends on the functions involved. It should also be noted that, each block in the block diagram and/or flowchart, and a combination of the blocks in the block diagram and/or flowchart, may be implemented by a dedicated hardware-based system that performs designated functions or operations, or may be implemented by a combination of dedicated hardware and computer instructions.

The units involved in the embodiments of the present disclosure may be implemented in software or hardware. Where a name of a unit does not constitute a limitation on the unit itself in one case. For example, a first acquiring unit may also be described as "a unit that acquires at least two Internet Protocol addresses".

Embodiments of the present disclosure also include a computer program, where when run on an electronic device or executed by a processor, the above functions defined in the methods of the embodiments of the present disclosure is executed.

The functions described above may be performed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

In a first aspect, an embodiment of the present disclosure provides a video processing method, including:
    obtaining a plurality of target sub-videos;
    obtaining a plurality of pictures respectively corresponding to the plurality of target sub-videos; and
    playing a respective target sub-video sequentially on the user interface while displaying the plurality of pictures in a user interface.

According to one or more embodiments of the present disclosure, the method further includes:
    splicing the plurality of target sub-videos into a target video, and recording a playback sequence and a playback duration corresponding to the respective target sub-video in the target video.

According to one or more embodiments of the present disclosure, the splicing the plurality of target sub-videos into the target video includes:
    performing, according to a preset sequence, a sequential splicing operation on the plurality of target sub-videos to generate the target video; and
    taking the preset sequence as the playback sequence corresponding to the respective target sub-video.

According to one or more embodiments of the present disclosure, the playing the respective target sub-video sequentially on the user interface includes:
    obtaining the playback sequence and the playback duration corresponding to the respective target sub-video; and
    playing, according to the playback sequence and the playback duration, the respective target sub-video in the target video on the user interface.

According to one or more embodiments of the present disclosure, the playing the respective target sub-video sequentially on the user interface includes:
    for each target sub-video, according to the playback sequence, performing the following operations:
    obtaining a playback address corresponding to a target sub-video;
    obtaining a corresponding target sub-video from the obtained playback address, and obtaining a playback address of a next target sub-video while playing the corresponding target sub-video on the user interface.

According to one or more embodiments of the present disclosure, the method includes:
  establishing, according to a correspondence relationship between the plurality of target sub-videos and the plurality of pictures, an association relationship between each target sub-video and a corresponding picture.

According to one or more embodiments of the present disclosure, the establishing, according to the correspondence relationship between the plurality of target sub-videos and the plurality of pictures, the association relationship between each target sub-video and the corresponding picture, including:
  storing video information of the plurality of target sub-videos in a video list, and storing picture information of the plurality of pictures in a picture list; and
  establishing, according to the correspondence relationship between the plurality of target sub-videos and the plurality of pictures, the association relationship between the respective target sub-video and the corresponding picture, through the video list and the picture list.

According to one or more embodiments of the present disclosure, the video information includes the playback sequence of the plurality of target sub-videos, and the playing the respective target sub-video sequentially on the user interface while displaying the plurality of pictures in the user interface includes:
  obtaining the playback sequence in the video information;
  determining, according to the association relationship between the plurality of target sub-videos and the plurality of pictures, the playback sequence corresponding to the plurality of target sub-videos as an initial display sequence of pictures respectively corresponding to the plurality of target sub-videos;
  playing, in accordance with the playback sequence, the respective target sub-video on the user interface, and adjusting, according to a playback progress of the respective target sub-video, a display state of the plurality of pictures in the user interface.

According to one or more embodiments of the present disclosure, the method further includes:
  jumping and displaying, in response to a first triggering operation acting on a target picture, a first target sub-video corresponding to the target picture through the association relationship, where the target picture includes any picture in the plurality of pictures.

According to one or more embodiments of the present disclosure, the jumping and displaying, in response to the first triggering operation acting on the target picture, the first target sub-video corresponding to the target picture through the association relationship includes:
  determining, in response to the first triggering operation acting on the target picture, the first target sub-video corresponding to the target picture through the association relationship;
  searching video information of the first target sub-video in the video list, where the video information includes at least one of a playback sequence, a playback duration, and a playback address of the first target sub-video; and
  playing, according to the video information corresponding to the first target sub-video, the first target sub-video.

According to one or more embodiments of the present disclosure, the method includes:
  jumping and displaying, in response to a triggering operation acting on a target picture in the plurality of pictures on the user interface, target information associated with the target picture, where the target picture includes any picture in the plurality of pictures, and the target information includes static information or dynamic information associated with the target picture.

In a second aspect, an embodiment of the present disclosure provides a video processing apparatus, the apparatus includes:
  an obtaining module, configured to:
  obtain a plurality of target sub-videos; and
  obtain a plurality of pictures respectively corresponding to the plurality of target sub-videos; and
  a linkage module, configured to play a respective target sub-video sequentially on the user interface while displaying the plurality of pictures in a user interface.

According to one or more embodiments of the present disclosure, the video processing apparatus further includes: a video splicing module; the video splicing module is configured to splice the plurality of target sub-videos into a target video, and record a playback sequence and a playback duration corresponding to the respective target sub-video in the target video.

According to one or more embodiments of the present disclosure, the video splicing module is configured to: perform, according to a preset sequence, a sequential splicing operation on the plurality of target sub-videos to generate the target video; and take the preset sequence as the playback sequence corresponding to the respective target sub-video.

According to one or more embodiments of the present disclosure, a linkage module is configured to: obtain the playback sequence and the playback duration corresponding to the respective target sub-video; and play, according to the playback sequence and the playback duration, the respective target sub-video in the target video on the user interface.

According to one or more embodiments of the present disclosure, the linkage module is further configured to: for each target sub-video, according to the playback sequence, perform the following operations: obtain a playback address corresponding to a target sub-video; obtain a corresponding target sub-video from the obtained playback address, and obtain a playback address of a next target sub-video while playing the corresponding target sub-video on the user interface.

According to one or more embodiments of the present disclosure, the apparatus may further include: an association relationship establishing module; the association relationship establishing module is configured to establish, according to a correspondence relationship between the plurality of target sub-videos and the plurality of pictures, an association relationship between each target sub-video and a corresponding picture.

According to one or more embodiments of the present disclosure, the association relationship establishing module is configured to: store video information of the plurality of target sub-videos in a video list, and storing picture information of the plurality of pictures in a picture list; establish, according to the correspondence relationship between the plurality of target sub-videos and the plurality of pictures, the association relationship between the respective target sub-video and the corresponding picture through the video list and the picture list.

According to one or more embodiments of the present disclosure, the video information includes the playback sequence of the plurality of target sub-videos, and the linkage module is further configured to: obtain the playback sequence in the video information; determine, according to the association relationship between the plurality of target sub-videos and the plurality of pictures, the playback sequence corresponding to the plurality of target sub-videos as an initial display sequence of pictures respectively corresponding to the plurality of target sub-videos; and play, in accordance with the playback sequence, the respective target sub-video on the user interface, and adjusting, according to a playback progress of the respective target sub-video, a display state of the plurality of pictures in the user interface.

According to one or more embodiments of the present disclosure, the apparatus may further include: a trigger operation responding module; the trigger operation responding module is configured to jump and display, in response to a first triggering operation acting on a target picture, a first target sub-video corresponding to the target picture through the association relationship, where the target picture includes any picture in the plurality of pictures.

According to one or more embodiments of the present disclosure, the trigger operation responding module is configured to: determine, in response to the first triggering operation acting on the target picture, the first target sub-video corresponding to the target picture through the association relationship; search video information of the first target sub-video in the video list, where the video information includes at least one of a playback sequence, a playback duration, and a playback address of the first target sub-video; and play, according to the video information corresponding to the first target sub-video, the first target sub-video.

According to one or more embodiments of the present disclosure, the triggering operation responding module is further configured to: jump and display, in response to a triggering operation acting on a target picture in the plurality of pictures on the user interface, target information associated with the target picture, where the target picture includes any picture in the plurality of pictures, and the target information includes static information or dynamic information associated with the target picture.

In a third aspect, embodiments of the present disclosure provide an electronic device,
including: at least one processor;
a memory;
the memory stores computer executable instructions;
the at least one processor executes the computer executable instructions stored in the memory, and enables the at least one processor to execute the video processing method according to any one of the above first aspect.

In a fourth aspect, embodiments of the present disclosure provide a computer readable storage medium, having computer executable instructions stored thereon, and when a processor executes the computer executable instructions, the video processing method according to any one of the above first aspect is implemented.

The above description is only preferred embodiments of the present disclosure and an illustration of the applied technical principles. Those skilled in the art should understand that, the disclosure scope involved in the present disclosure is not limited to the technical solutions formed by the specific combination of the above technical features, but also covers other technical solutions formed by the arbitrary combination of the above technical features or their equivalent features without departing from the above disclosure concept, for example, a technical solution formed by replacing the above features with technical features with similar functions disclosed (but not limited to) in the present disclosure.

In addition, although each operation is described in a specific order, this should not be understood as requiring these operations to be performed in the specific order or in a sequential order shown. Under certain circumstances, multitasking and parallel processing may be advantageous. Similarly, although several specific implementation details are included in the above discussion, these should not be interpreted as limiting the scope of the present disclosure. Certain features described in the context of a single embodiment may also be implemented in combination in the single embodiment. Conversely, various features described in the context of a single embodiment may also be implemented in multiple embodiments individually or in any suitable sub combination.

Although the subject matter has been described in language specific to structural features and/or method logical actions, it should be understood that the subject matter defined in the appended claims is not limited to the specific features or actions described above. On the contrary, the specific features and actions described above are only exemplary forms for implementing the claims.

What is claimed is:

1. A video processing method, comprising:
    obtaining a plurality of target sub-videos;
    obtaining a plurality of pictures respectively corresponding to the plurality of target sub-videos;
    playing a respective target sub-video sequentially on a user interface while displaying the plurality of pictures in the user interface; and
    in response to a triggering operation acting on a target picture on the user interface, switching from the user interface with the plurality of pictures and displaying a target interface associated with the target picture, and displaying target information associated with the target picture in the target interface, wherein the target picture is one of the plurality of pictures, and the target information comprises static information or dynamic information associated with the target picture, and the target information does not comprise the plurality of pictures.

2. The method according to claim 1, wherein the method further comprises:
    splicing the plurality of target sub-videos into a target video, and recording a playback sequence and a playback duration corresponding to the respective target sub-video in the target video.

3. The method according to claim 2, wherein the splicing the plurality of target sub-videos into the target video comprises:
    performing, according to a preset sequence, a sequential splicing operation on the plurality of target sub-videos to generate the target video; and
    taking the preset sequence as the playback sequence corresponding to the respective target sub-video.

4. The method according to claim 2, wherein the playing the respective target sub-video sequentially on the user interface comprises:
    obtaining the playback sequence and the playback duration corresponding to the respective target sub-video; and
    playing, according to the playback sequence and the playback duration, the respective target sub-video in the target video on the user interface.

5. The method according to claim 1, wherein the obtaining the plurality of target sub-videos and playing the respective target sub-video sequentially on the user interface comprises:

for each target sub-video, according to the playback sequence, performing the following operations:
  obtaining a playback address corresponding to a target sub-video;
  obtaining a corresponding target sub-video from the obtained playback address, and obtaining a playback address of a next target sub-video while playing the corresponding target sub-video on the user interface.

6. The method according to claim 1, wherein the method further comprises:
  establishing, according to a correspondence relationship between the plurality of target sub-videos and the plurality of pictures, an association relationship between each target sub-video and a corresponding picture.

7. The method according to claim 6, wherein the establishing, according to the correspondence relationship between the plurality of target sub-videos and the plurality of pictures, the association relationship between each target sub-video and the corresponding picture comprises:
  storing video information of the plurality of target sub-videos in a video list, and storing picture information of the plurality of pictures in a picture list; and
  establishing, according to the correspondence relationship between the plurality of target sub-videos and the plurality of pictures, the association relationship between the respective target sub-video and the corresponding picture, through the video list and the picture list.

8. The method according to claim 7, wherein the video information comprises the playback sequence of the plurality of target sub-videos, and, the playing the respective target sub-video sequentially on the user interface while displaying the plurality of pictures in the user interface comprises:
  obtaining the playback sequence in the video information;
  determining, according to the association relationship between the plurality of target sub-videos and the plurality of pictures, the playback sequence corresponding to the plurality of target sub-videos as an initial display sequence of pictures respectively corresponding to the plurality of target sub-videos; and
  playing, in accordance with the playback sequence, the respective target sub-video on the user interface, and adjusting, according to a playback progress of the respective target sub-video, a display state of the plurality of pictures in the user interface.

9. The method according to claim 6, wherein the method further comprises:
  jumping to and playing, in response to a first triggering operation acting on a first target picture, a first target sub-video corresponding to the first target picture in the user interface through the association relationship, wherein the first target picture comprises any picture in the plurality of pictures.

10. The method according to claim 9, wherein the jumping to and playing, in response to the first triggering operation acting on the first target picture, the first target sub-video corresponding to the first target picture through the association relationship comprises:
  determining, in response to the first triggering operation acting on the first target picture, the first target sub-video corresponding to the first target picture through the association relationship;
  searching video information of the first target sub-video in the video list, wherein the video information comprises at least one of a playback sequence, a playback duration, and a playback address of the first target sub-video; and
  playing, according to the video information corresponding to the first target sub-video, the first target sub-video in the user interface.

11. A video processing apparatus, comprising at least one processor and memory, the memory stores computer executable instructions;
  the at least one processor executes the computer executable instructions stored in the memory, so that the at least one processor is configured to:
  obtain a plurality of target sub-videos;
  obtain a plurality of pictures respectively corresponding to the plurality of target sub-videos;
  play a respective target sub-video sequentially on a user interface while displaying the plurality of pictures in the user interface; and
  in response to a triggering operation acting on a target picture on the user interface, switch from the user interface with the plurality of pictures and display a target interface associated with the target picture, and display target information associated with the target picture in the target interface, wherein the target picture is one of the plurality of pictures, and the target information comprises static information or dynamic information associated with the target picture, and the target information does not comprise the plurality of pictures.

12. The apparatus according to claim 11, wherein the at least one processor is further configured to:
  splice the plurality of target sub-videos into a target video, and record a playback sequence and a playback duration corresponding to the respective target sub-video in the target video.

13. The apparatus according to claim 12, wherein the at least one processor is further configured to:
  perform, according to a preset sequence, a sequential splicing operation on the plurality of target sub-videos to generate the target video; and
  take the preset sequence as the playback sequence corresponding to the respective target sub-video.

14. The apparatus according to claim 12, wherein the at least one processor is further configured to:
  obtain the playback sequence and the playback duration corresponding to the respective target sub-video; and
  play, according to the playback sequence and the playback duration, the respective target sub-video in the target video on the user interface.

15. The apparatus according to claim 11, wherein the at least one processor is further configured to:
  for each target sub-video, according to the playback sequence, perform the following operations:
  obtaining a playback address corresponding to a target sub-video;
  obtaining a corresponding target sub-video from the obtained playback address, and obtaining a playback address of a next target sub-video while playing the corresponding target sub-video on the user interface.

16. The apparatus according to claim 11, wherein the at least one processor is further configured to:
  establish, according to a correspondence relationship between the plurality of target sub-videos and the plurality of pictures, an association relationship between each target sub-video and a corresponding picture.

17. The apparatus according to claim 16, wherein the at least one processor is further configured to:
- store video information of the plurality of target sub-videos in a video list, and store picture information of the plurality of pictures in a picture list; and
- establish, according to the correspondence relationship between the plurality of target sub-videos and the plurality of pictures, the association relationship between the respective target sub-video and the corresponding picture, through the video list and the picture list.

18. The apparatus according to claim 17, wherein the video information comprises the playback sequence of the plurality of target sub-videos, and the at least one processor is further configured to:
- obtain the playback sequence in the video information;
- determine, according to the association relationship between the plurality of target sub-videos and the plurality of pictures, the playback sequence corresponding to the plurality of target sub-videos as an initial display sequence of pictures respectively corresponding to the plurality of target sub-videos; and
- play, in accordance with the playback sequence, the respective target sub-video on the user interface, and adjust, according to a playback progress of the respective target sub-video, a display state of the plurality of pictures in the user interface.

19. A non-transitory computer readable storage medium, having computer executable instructions stored thereon, wherein when a processor executes the computer executable instructions, the following steps are implemented:
- obtaining a plurality of target sub-videos;
- obtaining a plurality of pictures respectively corresponding to the plurality of target sub-videos;
- playing a respective target sub-video sequentially on a user interface while displaying the plurality of pictures in the user interface; and
- in response to a triggering operation acting on a target picture on the user interface, switching from the user interface with the plurality of pictures and displaying a target interface associated with the target picture, and displaying target information associated with the target picture in the target interface, wherein the target picture is one of the plurality of pictures, and the target information comprises static information or dynamic information associated with the target picture, and the target information does not comprise the plurality of pictures.

* * * * *